United States Patent
Ammann

(10) Patent No.: US 7,388,170 B2
(45) Date of Patent: Jun. 17, 2008

(54) PREPARING A PROTECTIVE GAS MIXTURE FOR ARC JOINING

(75) Inventor: Thomas Ammann, Munich (DE)

(73) Assignee: Linde Aktiengesellschaft, Wiesbaden (DE)

( * ) Notice: Subject to any disclaimer, the term of this patent is extended or adjusted under 35 U.S.C. 154(b) by 296 days.

(21) Appl. No.: 11/116,398

(22) Filed: Apr. 28, 2005

(65) Prior Publication Data

US 2005/0258143 A1    Nov. 24, 2005

(30) Foreign Application Priority Data

Apr. 29, 2004    (DE)    ........... 10 2004 021 065

(51) Int. Cl.
*B23K 9/16*    (2006.01)
*B23K 9/167*    (2006.01)
*B23K 9/173*    (2006.01)

(52) U.S. Cl. .............. 219/74; 219/75; 219/137 R; 252/372

(58) Field of Classification Search .......... 252/372; 219/74, 137 R, 75
See application file for complete search history.

(56) References Cited

U.S. PATENT DOCUMENTS

| | | |
|---|---|---|
| 4,749,841 A | 6/1988 | Galantino et al. |
| 6,624,387 B1 | 9/2003 | Tischler |
| 7,211,765 B2 * | 5/2007 | Trube et al. ............ 219/137 R |
| 2003/0234385 A1 * | 12/2003 | Miklos et al. ............ 252/372 |

FOREIGN PATENT DOCUMENTS

| | | |
|---|---|---|
| EP | 0 020 174 A1 | 12/1980 |
| EP | 0 544 187 B2 | 6/1993 |
| EP | 0 639 627 A1 | 2/1995 |
| EP | 1 101 559 A2 | 5/2001 |
| EP | 1 321 217 A1 | 6/2003 |
| GB | 736241 | 9/1955 |
| JP | 03 060868 A | 3/1991 |
| WO | WO 91/13720 * | 9/1991 |
| WO | WO 02/47859 A2 | 6/2002 |

* cited by examiner

*Primary Examiner*—Wayne A. Langel
(74) *Attorney, Agent, or Firm*—Crowell & Moring LLP

(57) ABSTRACT

This invention provides a method for on-site production of a protective gas mixture for arc joining, in particular for arc welding. Gaseous argon is removed from a liquid argon supply and helium is added to the argon, and a doping gas premix which is prepared separately on-site is added. Various combinations of argon, helium and the doping gas premix are supplied via a protective gas supply device which supplies multiple workplaces with different gas mixtures without the need for specialty gas mixing equipment.

10 Claims, 2 Drawing Sheets

PREPARING A PROTECTIVE GAS MIXTURE FOR ARC JOINING

This application claims the priority of German Application No. 10 2004 021 065.9, filed Apr. 29, 2004, the disclosure of which is expressly incorporated by reference herein.

BACKGROUND AND SUMMARY OF THE INVENTION

This invention relates to a method for on-site preparation of a protective gas mixture containing argon, helium and a doping gas for arc joining, in particular for arc welding, in which the argon is prepared by evaporation from the liquid phase. This invention also relates to a doping gas premix for on-site preparation of a protective gas mixture containing argon, helium and a doping gas for arc joining, in particular for arc welding. In addition, this invention relates to a protective gas supply device for on-site supply of workplaces comprising a liquid argon reservoir, a helium reservoir and a supply of doping gas premix, where the liquid argon reservoir is connected to at least one workplace via lines.

Arc joining includes arc welding, which has been in use for a long time, as well as arc soldering under a protective gas, the latter having recently become more important. In addition, arc joining also includes joining of different types of materials in which one material is melted while the other is only heated.

In arc welding under a protective gas, inert gases are the predominant component in the protective gas. Argon is the inert gas most commonly used in gas-shielded welding. By adding helium to argon, the heat balance of the protective gas in the arc and in the melt is improved so that a deeper fusion zone, better degassing and better wetting are achieved, depending on the material. Higher welding speeds are therefore obtained with helium. Addition of hydrogen when welding nickel-based materials (also Cr—Ni steel) often improves welding results. Addition of nitrogen or a nitrogen-hydrogen mixture to argon or argon-helium mixtures gives the desired improvement in various cases. Addition of nitrogen is thus often advantageous in the case of an austenitic material structure, but when welding or soldering materials with inert reducing gas mixtures or inert and slow-reacting gas mixtures, there are often disturbances in the process despite the choice of the gas mixture directed at the welding task. To eliminate these problems, small amounts of active gases are added to the inert reducing or inert and slow-reacting gas mixtures, thereby doping the gas mixtures. The doping is in the range of one percent, the so-called vpm range. For example, doping of inert gases with $CO_2$, $O_2$, NO or $N_2$ is well known when welding aluminum materials. Doping the welding protective gas with $CO_2$ or $O_2$ for nickel-based materials is described in EP 544 187. Doping with $CO_2$ or $O_2$ is also known in arc soldering and is described in EP 1 101 559. EP 639 627 describes the use of a doped gas mixture containing hydrogen. WO 02/47859 describes doped gas mixtures containing nitrogen for arc welding. Adding a doping gas improves the arc stability and the seam has a high-quality appearance. However, unwanted oxidation of the workpiece is prevented.

In summary, it can be concluded that very good welding results can be obtained only when a protective gas mixture optimized for the given welding task is used. The composition of the protective gas mixture is based exactly on the material, the properties of the welding workpiece, the arc stability and the welding speed. There are therefore many different protective gas mixtures.

To also be able to use the optimum protective gas mixture, it must be available in a sufficiently large quantity for the welding device. Normally a protective gas mixture in a ready-made form is already mixed with several components by the gas supplier and supplied in gas cylinders to the gas consumer. The gas consumer can then used the ready-made gas mixture without any additional operations. The large quantities of gas that must be supplied to the gas consumer are a disadvantage here. This is to be performed in a complex manner in particular when gas consumption is high. Since the volume of argon is reduced several fold by liquefaction, large quantities of gas are normally supplied and stored in liquid form. The required quantity of gas is removed in the form of vaporized liquid. Large-scale consumers therefore usually have a supply of liquid argon. Ready-made gas mixtures are consequently complex to handle for the large-scale consumer, especially in comparison with liquid argon supply.

Another possibility for the gas consumer to obtain the desired protective gas mixture is to mix it himself on-site. One disadvantage of on-site mixing techniques is that preparation of multicomponent mixtures is very complex and difficult and therefore gas mixtures with definitive volume amounts are often produced, leading to defective welding results. For the case when the gas consumer requires gas mixtures with volume amounts of less than one percentage point, which includes doped protective gas mixtures, these mixtures cannot be prepared with conventional mixers because only mixtures with a volume amount of components of at least one percent can be produced with conventional mixers. Doped gas mixtures, however, can be produced only with precision mixers, which can be considered as special parts that are very expensive. In addition, precision mixers are highly susceptible to defects.

EP 0 020 174 describes a method for mixing gases having different thermal conductivities. With this method it is possible to prepare a doped protective gas mixture. The mixing technique described there makes it possible to accurately prepare even volume amounts of a few percentage points in a mixture.

EP 1 321 217 describes a method for preparing a doped protective gas mixture of liquid argon and a gas-free premix. The liquid argon is vaporized and the gaseous argon is mixed with the gas premix consisting of the doping gas which is present in the gas premix in a higher concentration than in the ready-made protective gas mixture accordingly, plus helium and/or argon.

However, the problem of producing large quantities of protective gas mixtures tailored to specific welding or soldering jobs has not yet been solved satisfactorily from a technical standpoint or even in practical implementation. In particular, there is no simple and uncomplicated method that will permit the use of argon as a liquid argon supply and will yield the special doped protective gas mixture.

Therefore, the object of this invention is to provide a method which will permit the production of the doped protective gas mixture on-site, also incorporating a liquid argon supply, and which will have a high flexibility, so that the composition of the protective gas mixture can be varied with no problem as the welding job changes and can be adapted to the given welding and joining task. Furthermore, the object of this invention is to provide a corresponding doping gas premix. In addition, this invention provides a protective gas supply device for on-site supply of workplaces in such a way as to solve the problems defined above while being characterized by a high flexibility in particular.

This object is achieved with this method by adding helium to the gaseous argon and also adding a doping gas premix which is supplied separately on-site. By supplying the components separately, it is possible to use individual components and intermediates in addition to the ready-made protective gas mixture. Selected workplaces may be supplied with gaseous argon directly from the liquid argon supply and another group of workplaces may be supplied with an argon-helium mixture obtained by mixing together helium and vaporized argon. Finally, a third group of workplaces is supplied with the ready-made protective gas mixture of vaporized argon, helium and doping gas premix. Furthermore, it is also possible to supply workplaces with a gas mixture of vaporized argon and the doping gas premix. This flexibility in on-site preparation of protective gas mixtures is offered only by the inventive method. It is thus possible to provide the optimized protective gas mixture for each workplace and for each welding job. Furthermore, argon which accounts for the largest amount in this inventive method is obtained from the liquid argon supply, so all advantages offered by a liquid argon supply can be utilized. Furthermore, with the on-hand liquid argon supply, only mixers are needed to obtain an optimum protective gas mixture for welding. A particular advantage that should be emphasized is that conventional two-component or three-component mixers are sufficient to prepare the protective mixture although the protective gas mixture also contains doping in the vpm range. Doped protective gas mixtures are normally critical to produce due to the small quantity of doping gas added. Since the doping gas is part of a doping gas premix, the mixing ratios that must be set with the inventive method are in the percentage range and consequently can be established with conventional mixers in a completely unproblematical manner.

The helium and the doping gas premix are advantageously added separately from one another. With this procedure, a very high flexibility is obtained with very little complexity. If the vaporized argon is first combined with the helium (and this variant is regarded as preferred) and then the argon-helium mixture is combined with the doping gas premix, then pure argon, the argon-helium mixture and the doped protective gas mixture are available as the protective gas. If the argon is first combined with the doping gas premix and then this mixture is combined with helium, then argon, doped argon and the doped argon-helium mixture are available as the protective gas. In another variant of the embodiment, the mixing of argon, helium and the doping gas premix is performed in a three-component mixer. It is also possible to add helium or the doping gas premix separately each at selected workplaces and in this way to adjust different helium amounts or different concentrations of doping gas. The amount of helium in the ready-made gas mixture is advantageously 5 to 70 vol %, preferably 10 to 50 vol % and especially preferably 15 to 30 vol %. With all variants, a doped protective gas mixture is generated on-site in an uncomplicated manner and at the same time a very high flexibility is achieved with the inventive method, making it possible to provide the optimum protective gas composition for the particular welding job. A high flexibility is advantageous in particular in preparing protective gas for different workplaces with different welding jobs. In a factory, it is often necessary to supply workplaces which are equipped with different welding equipment and at which different welding jobs are being performed. Doped protective gas mixtures in particular are advantageous at workplaces where robots perform the welding work, whereas argon is often preferred as the protective gas at workplaces where welding is performed manually. In addition to this criterion, the material and the properties of the workpiece also influence the choice of protective gas.

In another advantageous embodiment, the helium and the doping gas premix are added using a three-component mixer. The helium and the doping gas premix are also available separately on-site in this embodiment of the invention. To prepare the doped protective gas mixture, a single conventional mixer is sufficient. A precision mixer is not necessary for this. It is thus possible in a very simple way to supply workplaces with vaporized argon and other places with the doped protective gas mixture.

It is especially advantageous to add the doping gas plus at least one other component to the protective gas mixture with the doping gas premix. The inventive method thus yields in a very simple way a multicomponent doped protective gas mixture, with a very high flexibility in the volume amounts. The ready-made protective gas mixture contains the other component in a volume amount of 1 to 8 vol %, preferably 1.5 to 5 vol %, especially preferably from 1.8 to 3 vol %.

As the additional component, hydrogen and/or nitrogen is advantageously used. Thus the especially advantageous doped protective gas mixtures of helium, argon and hydrogen and/or nitrogen are prepared.

In an advantageous embodiment, a gas or a mixture of the gases NO, $N_2$, $O_2$ or $CO_2$ is used as the doping gas. Especially good welding and soldering results are obtained with these doping gases.

A doping gas premix containing the doping gas in a concentration of 0.005 to 10 vol %, preferably 0.1 to 5 vol %, especially preferably 1 to 3 vol % is used to advantage. With these concentrations in the doping gas premix, ready-made protective gas mixtures with the desired doping gas concentrations are prepared. The concentrations of the doping gas in the ready-made protective gas mixture are in the range of 10 to 10,000 vpm, preferably in the range of 50 to 1000 vpm.

In an advantageous embodiment, the inventive method is used to prepare protective gas mixtures for high-alloy materials and nickel-based materials. In arc joining of these materials, doped multicomponent protective gas mixtures are especially advantageous. These protective gas mixtures are especially suitable for special steels and corrosion-resistant steel. It is therefore especially advantageous to use the inventive method when processing such materials.

Advantageously, at least one workplace is supplied exclusively with vaporized argon and at least one workplace is supplied with the protective gas mixture by the method according to this invention. Thus the advantages with regard to the flexibility of the inventive method are utilized.

In addition, advantageously at least one workplace is supplied with an argon-helium mixture. Use of the argon-helium mixture is an important advantage which is obtained by preparing the protective gas according to this invention.

This object is achieved with regard to the doping gas premix by the fact that the doping gas premix contains the doping gas in a concentration of 0.005 to 10 vol % and also contains hydrogen and/or nitrogen as the additional component. With this doping gas premix, a particularly advantageous protective gas mixture is obtained by using the preparation method according to this invention.

It is especially advantageous for the doping gas to be a gas or a mixture of the gases NO, $N_2$, $O_2$ or $CO_2$. These doping gases ensure that not only the welds and the soldered connections will have an optimum appearance and unacceptable oxidation will be prevented but also there is an improvement in the stability of the arc.

The concentration of the doping gas is advantageously 0.1 to 5 vol %, preferably 1 to 3 vol %.

For the protective gas supply device, the object is achieved by the fact that the liquid argon reservoir is connected to at least one additional workplace via supply lines including at least one mixer whereby the mixer(s) is/are connected to the liquid argon reservoir, the helium supply and the doping gas premix supply. The inventive protective gas supply device manifests its aforementioned advantages in workplaces with different welding jobs. Reservoirs and supply tanks are advantageously designed as follows: one tank with liquid argon, one or two bundles with helium and one or two gas cylinders with doping gas premix. Having duplicate bundles and cylinders on hand permits a continuous supply of gas to the workplaces even while the supply containers are being replaced.

In an advantageous embodiment, the supply lines containing the mixer are equipped with a three-component mixer. In this embodiment, it is very easily possible to supply some workplaces with vaporized argon and other workplaces with the doped protective gas mixture.

In another advantageous embodiment, the supply lines containing the mixer are equipped with two mixers, whereby the feed side of the first mixer is connected to the liquid argon reservoir and to the helium supply and the discharge side of the first mixer is connected to at least one other workplace and the feed side of the second mixer is connected to the discharge side of the first mixer and to the doping gas premix supply, and the discharge side of the second mixer is connected to at least one additional workplace by lines. The high flexibility of the inventive protective gas supply device is manifested here. Some workplaces are connected to the liquid argon reservoir and other workplaces receive an argon-helium mixture while a third group of workplaces receive a doped protective gas mixture.

Other objects, advantages and novel features of the present invention will become apparent from the following detailed description of the invention when considered in conjunction with the accompanying drawings.

DETAILED DESCRIPTION

Figure 1:
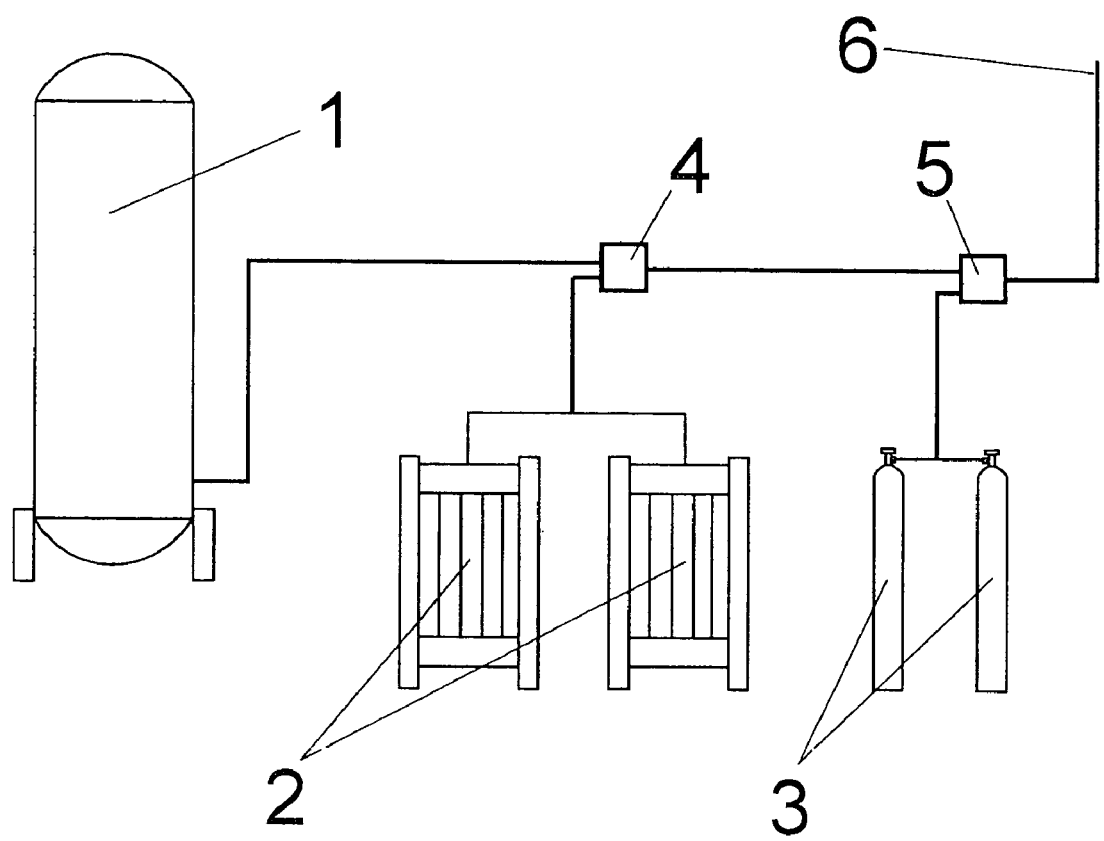
FIG. 1 shows an exemplary embodiment of the inventive method for on-site preparation of protective gas.

FIG. 1 shows a liquid argon reservoir 1, two helium bundles 2, two gas cylinders with a doping gas premix 3, two mixers 4, 5 and a supply line carrying the ready-made gas mixture to a workplace 6. Gaseous argon is removed from the liquid argon reservoir 1 and sent to the first mixer 4. Gaseous helium is removed from one of the two helium bundles 2 and sent to the first mixer 4. The process is switched to the second helium bundle when the first helium bundle is empty and must be replaced. Then argon and helium are combined to form an argon-helium gas mixture in the first mixer 4. The argon-helium gas mixture is mixed with the doping gas premix in the second mixer 5. To do so, the doping gas premix is removed from the gas cylinder 3 and sent to the second mixer 5. The second gas cylinder with the doping gas premix is in turn used to permit an uninterrupted sequence when changing cylinders. The ready-made protective gas mixture is sent to the workplace via the feed line 6.

Figure 2:
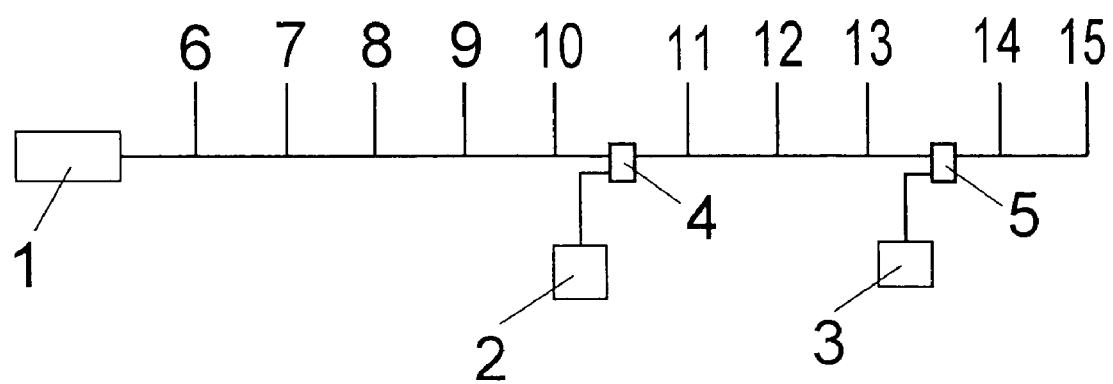
FIG. 2 shows an exemplary embodiment of the inventive method and the inventive device in a factory building having multiple workplaces.

FIG. 2 shows symbolically a liquid argon reservoir 1, a helium supply 2, a doping gas premix supply 3, two mixers 4, 5 and feed lines to ten workplaces 6 through 15. The gaseous argon removed from the liquid argon reservoir 1 is sent to the workplaces 4 through 10. Furthermore, the gaseous argon is sent to the feed side of the mixer 4. The helium supply 2 is also connected to the feed side of the mixer 4. Then the argon-helium mixture required at the workplaces 11 through 13 is obtained in the mixer. The argon-helium mixture is sent from the discharge side of the mixer 4 to the workplaces 11 through 13. The argon-helium mixture is also fed into the second mixer 5. The doping gas premix is also introduced from the doping gas premix supply 3 into the second mixer 5, and the argon-helium mixture and the doping gas premix are added to the protective gas mixture required at the workplaces 14 and 15. The ready-made protective gas mixture is sent from the mixer 5 to the workplaces 14 and 15.

Gas mixtures prepared with this invention include, for example, argon-helium mixtures doped with oxygen or carbon dioxide in the following volume amounts: 300 vpm oxygen and 2% hydrogen in 15% or 30% helium and the remaining being argon or 550 vpm carbon dioxide and 2% hydrogen in 30% helium and the remainder being argon. For example, 2.75% carbon dioxide in hydrogen or 1.4% oxygen in hydrogen is used as the doping gas premixes. The ready-made protective gas mixtures are optimum for arc welding because a good appearance of the weld, avoidance of oxidation, a good fusion zone, good degassing and good wetting are achieved with such mixtures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of on-site preparation of a protective gas mixture containing argon, helium and a doping gas for arc joining, comprising the steps of:
   evaporating argon from a liquid phase on-site;
   supplying helium and a doping gas premix containing the doping gas separately from the gaseous argon;
   adding the helium and the doping gas premix to the gaseous argon on-site, wherein the helium and the doping gas premix are added separately from one another, and the doping gas premix contains the doping gas in a concentration of 0.005 to 10 vol %.

2. Method as claimed in claim 1, wherein the helium and the doping gas premix are added using a three-component mixer.

3. Method as claimed in claim 1, wherein the doping gas and at least one additional component are added to the protective gas mixture together in the doping gas premix.

4. Method as claimed in claim 3, wherein at least one gas selected from the group consisting of hydrogen and nitrogen is used as the additional component.

5. Method as claimed in claim 1, wherein at least one gas selected from the group consisting of NO, $N_2$, $O_2$ and $CO_2$ is used as the doping gas.

6. Method as claimed in claim 1, wherein the doping gas premix contains the doping gas in a concentration of 0.1 to 5 vol %.

7. Method as claimed in claim 1, wherein the doping gas premix contains the doping gas in a concentration of 1 to 3 vol %.

8. Method as claimed in claim 1, further comprising the step of using the protective gas mixture in arc joining of at least one of high-alloy materials and nickel-based materials.

9. Method as claimed in claim 1, further comprising the steps of:
   supplying at least one workplace exclusively with vaporized argon; and
   supplying at least one additional workplace with the protective gas mixture.

10. Method as claimed in claim 9, further comprising the steps of:
    supplying at least one additional workplace with an argon-helium mixture.

* * * * *